United States Patent
Kim (10) Patent No.: US 9,973,458 B2
(45) Date of Patent: May 15, 2018

(54) MOBILE CHAT SYSTEM FOR SUPPORTING CARTOON STORY-STYLE COMMUNICATION ON WEBPAGE

(71) Applicant: I-ON COMMUNICATIONS CO., LTD., Seoul (KR)

(72) Inventor: Hong Rae Kim, Seoul (KR)

(73) Assignee: I-ON COMMUNICATIONS CO., LTD., Seoul (KR)

(\*) Notice: Subject to any disclaimer, the term of this patent is extended or adjusted under 35 U.S.C. 154(b) by 410 days.

(21) Appl. No.: 14/390,996

(22) PCT Filed: Apr. 5, 2013

(86) PCT No.: PCT/KR2013/002875
§ 371 (c)(1),
(2) Date: Oct. 6, 2014

(87) PCT Pub. No.: WO2013/151384
PCT Pub. Date: Oct. 10, 2013

(65) Prior Publication Data
US 2015/0121256 A1    Apr. 30, 2015

(30) Foreign Application Priority Data

Apr. 6, 2012  (KR) .................. 10-2012-0036341

(51) Int. Cl.
*G06F 3/0484* (2013.01)
*H04L 12/18* (2006.01)
(Continued)

(52) U.S. Cl.
CPC .......... *H04L 51/046* (2013.01); *G06F 3/0484* (2013.01); *G06F 3/167* (2013.01); *G06Q 10/10* (2013.01); *H04L 12/1827* (2013.01)

(58) Field of Classification Search
CPC .... G06Q 10/10; H04L 12/1827; G06F 3/0484
(Continued)

(56) References Cited

U.S. PATENT DOCUMENTS 6,069,622 A    5/2000  Kurlander
6,232,966 B1 *  5/2001  Kurlander ............... G06T 11/60
                                                    715/764

(Continued)

FOREIGN PATENT DOCUMENTS

JP   2000207304 A   7/2000
JP   2004102496 A   4/2004
(Continued)

OTHER PUBLICATIONS

Kurlander et al., Comic Chat, Reprinted from Proceedings of SIGGRAPH 96, available at http://kurlander.net/DJ/Pubs/SIGGRAPH96.pdf (1996).*

(Continued)

*Primary Examiner* — Steven Sax
*Assistant Examiner* — Conrad Pack
(74) *Attorney, Agent, or Firm* — Lathrop Gage LLP (57) ABSTRACT

Provided is a mobile chatting system for allowing cartoon story-type chatting between chatting users of a mobile terminal on which a cartoon-type chatting application is installed and a mobile terminal on which the cartoon-type chatting application is not installed, which includes: a first mobile terminal on which a cartoon-type chatting application is installed; a second mobile terminal for allowing chatting in a cartoon story form through a web page; a chatting server for relaying chatting between the first and second mobile terminals; and a chatting web server for, when a chatting message is input from the second mobile (Continued)

terminal, displaying the message and the user of the second mobile terminal with a cartoon character on the chatting web page.

9 Claims, 4 Drawing Sheets

(51) Int. Cl.
  *H04L 12/58* (2006.01)
  *G06Q 10/10* (2012.01)
  *G06F 3/16* (2006.01)
(58) Field of Classification Search
  USPC .......................................................... 715/758
  See application file for complete search history.

(56) References Cited

U.S. PATENT DOCUMENTS

| | | | | |
|---|---|---|---|---|
| 7,379,066 B1* | 5/2008 | Ostermann | ........ | G06Q 30/0601 345/473 |
| 7,818,340 B1* | 10/2010 | Warren | .................. | G06Q 10/10 705/14.54 |
| 2001/0018658 A1* | 8/2001 | Kim | .................. | G06F 17/30873 463/9 |
| 2007/0113181 A1* | 5/2007 | Blattner | .................. | G06F 3/011 715/706 |
| 2008/0019353 A1* | 1/2008 | Foote | .................. | H04L 12/1822 370/352 |
| 2009/0254840 A1* | 10/2009 | Churchill | ............... | G06F 3/0481 715/753 |

FOREIGN PATENT DOCUMENTS

| | | |
|---|---|---|
| JP | 2006520053 A | 8/2006 |
| JP | 2007-025936 A | 2/2007 |
| JP | 2009157746 A | 7/2009 |
| JP | 2010506244 A | 2/2010 |
| KR | 10-2001-0083820 A | 9/2001 |
| KR | 10-2002-0021940 A | 3/2002 |
| WO | WO 2004079530 A2 | 9/2004 |
| WO | WO 2007143551 A2 | 12/2007 |

OTHER PUBLICATIONS

Homepage of Apple Search AppSentas, Mar. 13, 2012, http://appsentas.kr/detail/index/503080370.html 3 pages.
PCT/KR2013/002875 English Translation of International Search Report dated Jul. 1, 2013, 2 pages.

* cited by examiner

MOBILE CHAT SYSTEM FOR SUPPORTING CARTOON STORY-STYLE COMMUNICATION ON WEBPAGE

FIELD OF THE INVENTION

The present invention relates to a mobile chatting system supporting a cartoon story-type conversation on a web page, and more particularly, to a mobile chatting system for allowing cartoon story-type chatting between chatting users of a mobile terminal at which a chatting application for displaying chatting in a cartoon story form is installed and a mobile terminal at which the chatting application is not installed.

DESCRIPTION OF THE RELATED ART

As smart phones are now widely propagated, free text message service has become more competitive. "Kakao Talk" is a representative free text-message service application. It has been reported that the number of domestic subscribers (in Korea) of Kakao Talk exceeds 32 million, the number of foreign subscribers exceeds 6 million, and about 1 billion text messages are exchanged per day by Kakao Talk (announced by Kakao Corp. at the end of 2011). At the present, "My People" (Daum Communications), "Line" (NHN Corp.), "Tictok" (MadSmart Corp.) and the like have been launched as second movers of Kakao Talk to give differentiated free text-message service.

First, "My People" of Daum Communications can be used by PCs as well as smart phones. An existing messenger application such as Kakao Talk has allowed message exchange just through smart phones and is not available in PCs. In addition, "My People" gives free voice-call service.

"Line" of NHN Corp. additionally gives a friend-adding function by shaking a smart phone, a voice-call function, a weather information service, a Japanese interpretation function and an image-call function (scheduled), and is available in PCs and tablet PCs.

"Tictoc" of MadSmart Corp. allows fast message transmission and has a social function (so-called Gurum), which is a kind of SNS function, in which persons having a common interest can introduce each other, talk with each other and share information.

However, such existing text message service applications are not interesting since mobile terminal users just exchange text messages, and thus have a limited ability to arouse interest of the terminal users who are chatting. In this regard, text-message service applications have recently added emoticon and sticker functions to show various expressions of the mobile terminal users, but this is also based on text messages and is not enough to configure an interesting story with conversations of the terminal users.

In addition, when a mobile terminal user uses such a free text-message service, the service just functions as a channel for conversation among multiple users, and does not encourage them to use the corresponding mobile chatting system.

SUMMARY OF THE INVENTION

Object of the Invention

The present invention is directed to providing a mobile chatting system supporting a cartoon story-type conversation on a web page to solve the following problems.

First, the present invention is directed to providing a mobile chatting system, which may give a chatting service with a story, beyond an existing chatting method based on text messages.

Second, the present invention is directed to providing a mobile chatting system, which may encourage mobile chatting users to more actively participate in mobile chatting.

Third, the present invention is directed to providing a mobile chatting system, which may efficiently show the emotions of mobile chatting users.

Objects of the present invention are not limited to the above, and other objects would be clearly understood by those skilled in the art from the following disclosure.

Constitution of the Invention

In this regard, the mobile chatting system supporting a cartoon story-type conversation on a web page according to the present invention gives the following solutions.

In one general aspect, the present invention provides a mobile chatting system for allowing cartoon story-type chatting between chatting users of a mobile terminal on which a chatting application for displaying chatting in a cartoon story form is installed and a mobile terminal on which the chatting application is not installed, the mobile chatting system comprising: a first mobile terminal on which the chatting application is installed, wherein when transmitting or receiving a chatting message of the chatting user, the first mobile terminal displays a cartoon character as the chatting user, displays the chatting message in a speech balloon form beside the cartoon character, and displays chatting between the chatting users in a cartoon story form; a second mobile terminal configured to, when receiving a chatting message from the first mobile terminal, display a cartoon character as the chatting user on a chatting web page, display the chatting message of the chatting user in a speech balloon form beside the cartoon character, and display chatting between the chatting users in a cartoon story form; a chatting server configured to relay chatting between mobile terminals by transmitting or receiving the chatting message and the cartoon character of the chatting user between the first mobile terminal and the second mobile terminal; and a chatting web server configured to display the chatting message and the cartoon character received from the first mobile terminal through the chatting server on the chatting web page accessed by the second mobile terminal, when a chatting message is input from the second mobile terminal, to display the chatting message input by the second mobile terminal and the cartoon character of the second mobile terminal user on the chatting web page, and to transmit the chatting message input by the second mobile terminal and the cartoon character of the second mobile terminal user to the first mobile terminal through the chatting server.

The mobile chatting system supporting a cartoon story-type conversation on a web page according to the present invention may further include a manager server configured to receive a chatting message transmitted or received by the first mobile terminal through the chatting server, to calculate a data transmission traffic of the chatting message transmitted or received by the first mobile terminal, and to endow a predetermined point to a user ID of the first mobile terminal in proportion to the data transmission traffic.

In the mobile chatting system supporting a cartoon story-type conversation on a web page according to the present invention, the first mobile terminal may include: a first message-writing unit configured to receive a chatting message from a chatting user of the first mobile terminal; a first message-transmitting/receiving unit configured to receive the chatting message from the first message-writing unit, to transmit the chatting message to the chatting server, and to receive a chatting message transmitted by the second mobile terminal from the chatting server; a first image-forming unit configured to receive a chatting message input by the first mobile terminal user from the first message-writing unit, to display the chatting message in a speech balloon form beside a cartoon character of the chatting user, and to display a chatting message transmitted by the second mobile terminal from the first message-transmitting/receiving unit beside a user cartoon character of the second mobile terminal in a speech balloon form, thereby displaying chatting between the chatting users at the first mobile terminal in a cartoon story form; and a first image-storing unit for storing chatting between the chatting users in the cartoon story form as a cartoon image.

In the mobile chatting system supporting a cartoon story-type conversation on a web page according to the present invention, the first image-forming unit may recognize a text included in a chatting message input by users of the first mobile terminal and the second mobile terminal, and automatically change an expression of user cartoon characters of the first mobile terminal and the second mobile terminal according to the nature of the text.

In the mobile chatting system supporting a cartoon story-type conversation on a web page according to the present invention, the chatting web server may include: a second message-writing unit configured to receive a chatting message from a chatting user of the second mobile terminal; a second message-transmitting/receiving unit configured to receive the chatting message from the second message-writing unit, to transmit the chatting message to the chatting server, and to receive a chatting message transmitted by the first mobile terminal from the chatting server; a second image-forming unit configured to receive a chatting message input by the second mobile terminal user from the second message-writing unit, to display the chatting message in a speech balloon form beside a cartoon character of the chatting user on the web page, and to display a chatting message transmitted by the first mobile terminal from the second message-transmitting/receiving unit in a speech balloon form beside a user cartoon character of the first mobile terminal, thereby displaying chatting between the chatting users in a cartoon story form on the web page of the second mobile terminal; and a second image-storing unit configured to store chatting between the chatting users in the cartoon story form as a cartoon image.

In the mobile chatting system supporting a cartoon story-type conversation on a web page according to the present invention, the second image-forming unit may recognize a text included in a chatting message input by users of the first mobile terminal and the second mobile terminal, and automatically change an expression of user cartoon characters of the first mobile terminal and the second mobile terminal according to the nature of the text.

In the mobile chatting system supporting a cartoon story-type conversation on a web page according to the present invention, the first mobile terminal may include: a first voice-recognizing unit configured to recognize a voice of a chatting user of the first mobile terminal; a first voice-analyzing unit configured to analyze a tone of the recognized voice; a first voice-data-converting unit configured to convert a chatting message input to the first mobile terminal into voice information; a first tone-converting unit configured to receive voice information from the first voice-data-converting unit and convert the voice information into a tone of the chatting user of the first mobile terminal, recognized by the first voice-analyzing unit; and a first voice-output unit configured to output the voice information of the chatting message, converted into the first mobile terminal user tone by the first tone-converting unit to a speaker of the first mobile terminal, wherein the first voice-output unit transmits the voice information of the chatting message, converted into the first mobile terminal chatting user tone, to the second mobile terminal through the chatting server so that the chatting message input by the first mobile terminal is also output to the second mobile terminal with the voice information of the chatting message converted into the first mobile terminal chatting user tone.

In the mobile chatting system supporting a cartoon story-type conversation on a web page according to the present invention, the chatting web server may include: a second voice-recognizing unit configured to recognize a voice of a chatting user of the second mobile terminal; a second voice-analyzing unit configured to analyze a tone of the recognized voice; a second voice-data-converting unit configured to convert a chatting message input to the second mobile terminal into voice information; a second tone-converting unit configured to receive the converted voice information from the second voice-data-converting unit and convert the voice information into the second mobile terminal user tone recognized by the second voice-analyzing unit; and a second voice-output unit configured to output the voice information of the chatting message, converted into the second mobile terminal user tone by the second tone-converting unit, to a speaker of the second mobile terminal, wherein the second voice-output unit transmits the voice information of the chatting message, converted into the second mobile terminal chatting user tone, to the first mobile terminal through the chatting server so that the chatting message input by the second mobile terminal is also output to the first mobile terminal with the voice information of the chatting message converted into the second mobile terminal chatting user tone.

Effect of the Invention

The mobile chatting system supporting a cartoon story-type conversation on a web page according to the present invention gives the following effects.

First, since conversation of chatting users is made in a cartoon story form, the chatting users may feel as if a cartoon story is composed by mobile chatting.

Second, since a predetermined point is endowed to an ID of a chatting user according to the data transmission traffic of a message transmitted by the chatting user, the chatting user may be encouraged to more actively participate in the chatting.

Third, since an expression of a character is changed according to the nature of a text input by a chatting user, and also the text input by the chatting user is converted into voice and transferred to a chatting partner with the tone of the chatting user, an emotion of the mobile chatting user may be efficiently conveyed.

Effects of the present invention are not limited to the above, and other effects would be clearly understood by those skilled in the art from the following disclosures.

DETAILED DESCRIPTION OF THE INVENTION

The singular forms used in the specification are intended to include the plural forms as well, unless the context clearly indicates otherwise. It will be further understood that the terms "comprises" and/or "comprising," or "includes" and/or "including" specify the presence of stated features, regions, integers, steps, operations, elements, and/or components, but do not preclude the presence or addition of one or more other features, regions, integers, steps, operations, elements, components, and/or groups thereof.

Hereinafter, a mobile chatting system supporting a cartoon story-type conversation on a web page according to the present invention will be described in detail.

Figure 1:
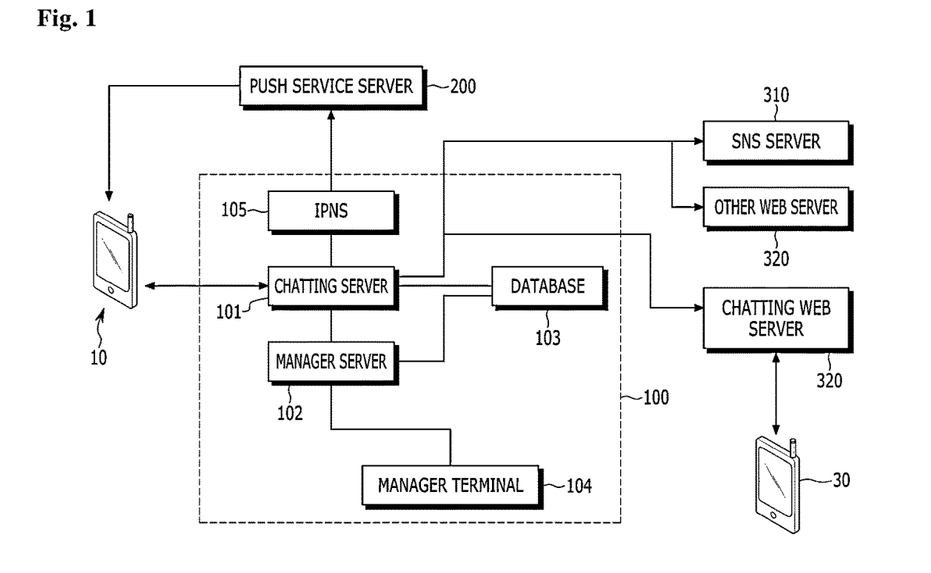
FIG. 1 is a block diagram showing a mobile chatting system supporting a cartoon story-type conversation on a web page according to a preferred embodiment of the present invention.
Figure 2:
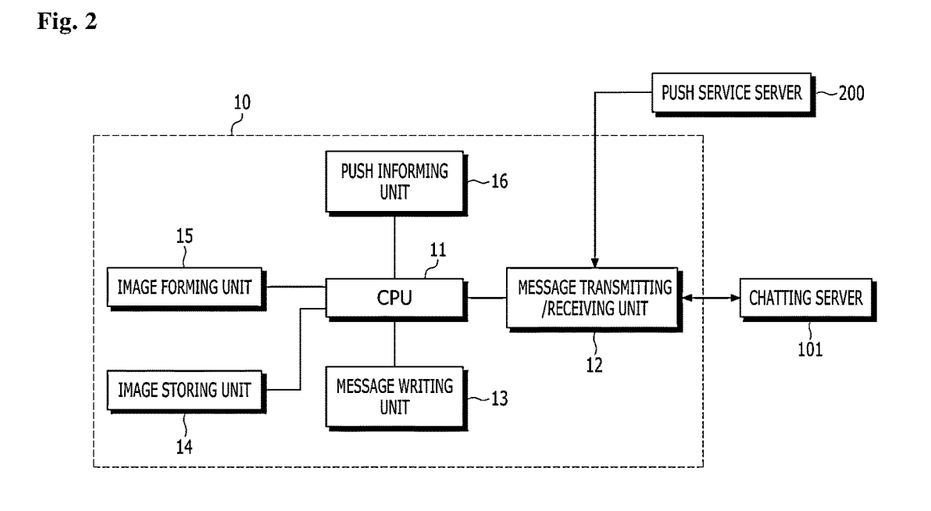
FIG. 2 is a block diagram showing an inner configuration of a first mobile terminal according to a preferred embodiment of the present invention.
Figure 3:
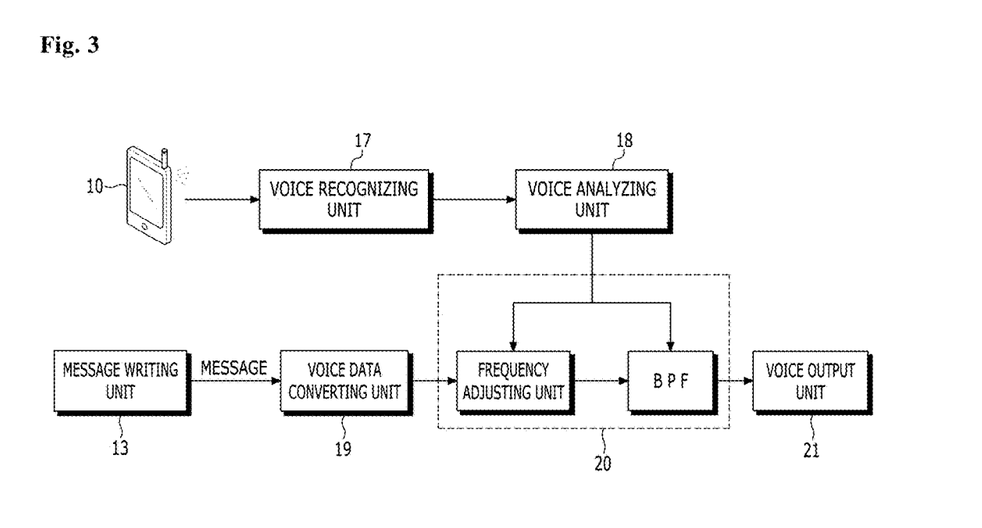
FIG. 3 is block diagram showing a component for recognizing and processing the voice of a first mobile terminal user according to a preferred embodiment of the present invention.
Figure 4:
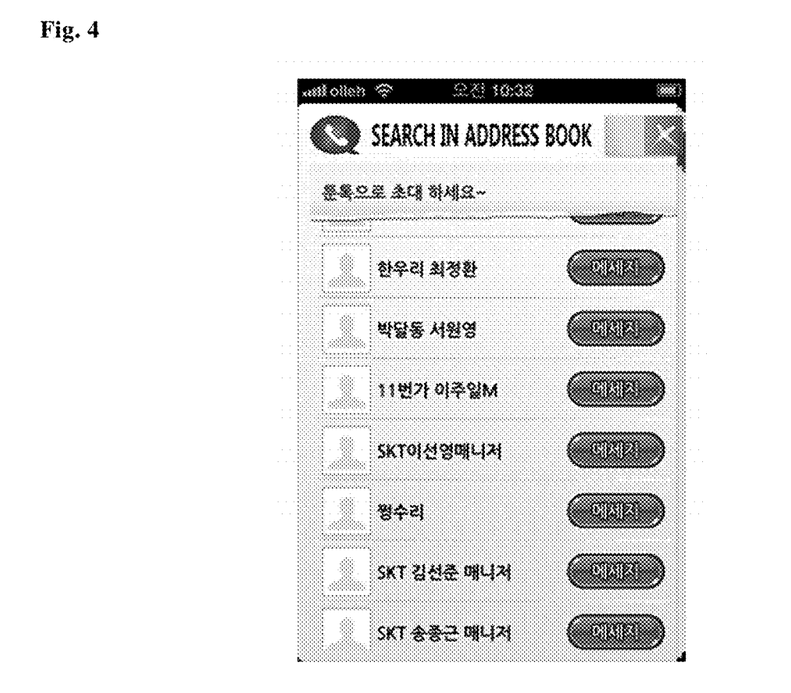
FIG. 4 shows the screen of the first mobile terminal which displays an address book of a chatting partner according to a preferred embodiment of the present invention.
Figure 5:
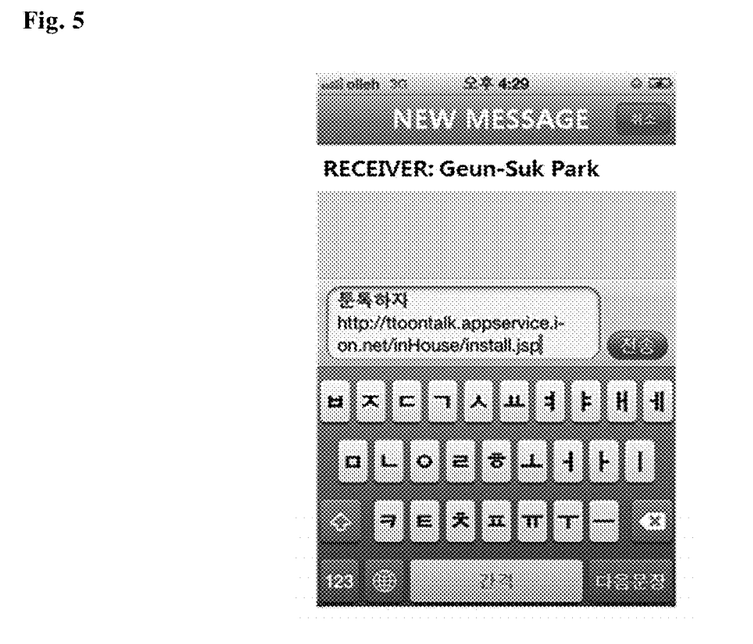
FIG. 5 shows the screen of the first mobile terminal which transmits an access request message to a chatting partner mobile terminal—namely, a second mobile terminal, according to a preferred embodiment of the present invention.
Figure 6:
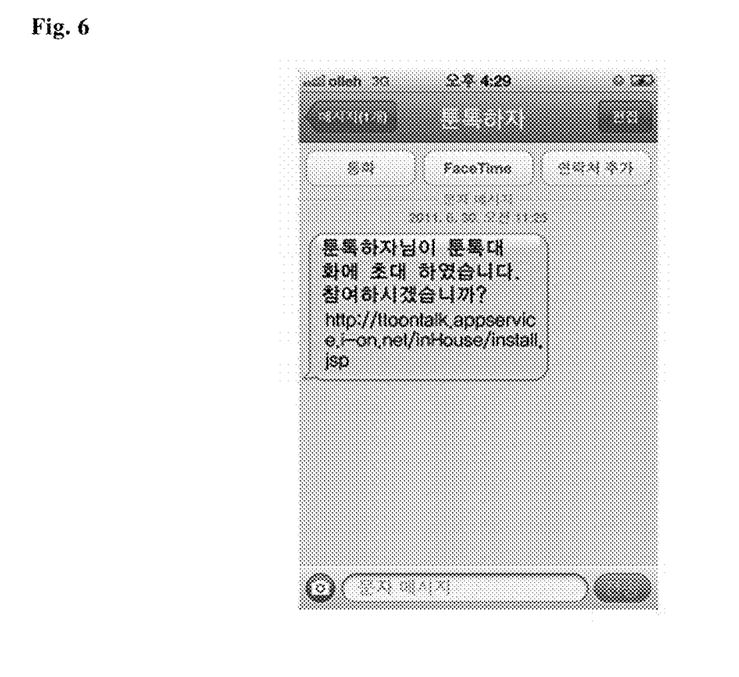
FIG. 6 shows the screen of the second mobile terminal which receives the access request message according to a preferred embodiment of the present invention.
Figure 7:
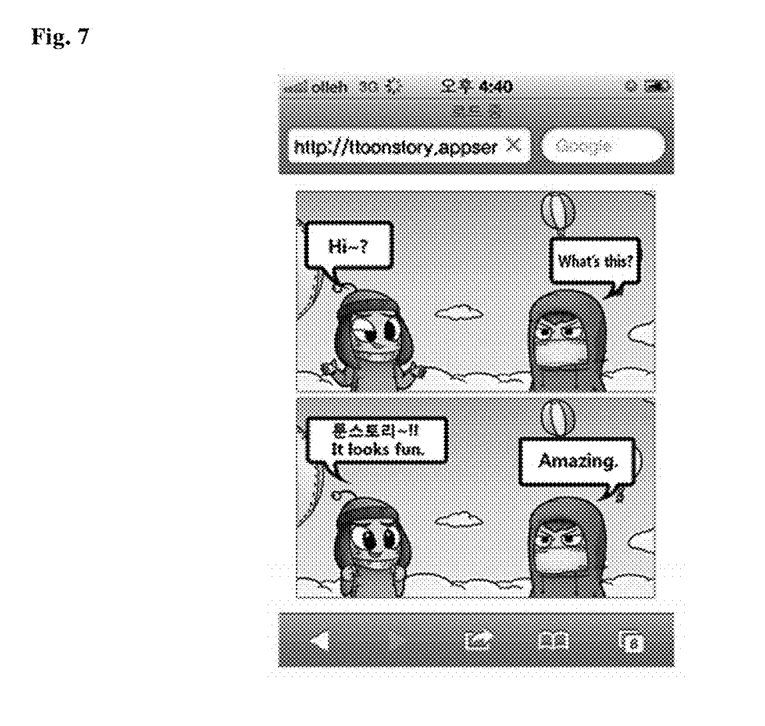
FIG. 7 shows the screen of the second mobile terminal showing that the first mobile terminal chatting user and the second mobile terminal chatting user are chatting in a cartoon story form on a web page according to a preferred embodiment of the present invention.

FIG. 1 is a block diagram showing a mobile chatting system supporting a cartoon story-type conversation on a web page according to a preferred embodiment of the present invention, FIG. 2 is a block diagram showing an inner configuration of a first mobile terminal according to a preferred embodiment of the present invention, FIG. 3 is a block diagram showing a component for recognizing and processing the voice of a first mobile terminal user according to a preferred embodiment of the present invention, FIG. 4 shows the screen of the first mobile terminal which displays an address book of a chatting partner according to a preferred embodiment of the present invention, FIG. 5 shows the screen of the first mobile terminal which transmits an access-request message to a chatting partner mobile terminal—namely, a second mobile terminal, according to a preferred embodiment of the present invention, FIG. 6 shows the screen of the second mobile terminal which receives the access-request message according to a preferred embodiment of the present invention, and FIG. 7 shows the screen of the second mobile terminal showing that the first mobile terminal chatting user and the second mobile terminal chatting user are chatting in a cartoon story form on a web page according to a preferred embodiment of the present invention.

A mobile chatting system supporting a cartoon story-type conversation on a web page according to the present invention allows cartoon story-type chatting between chatting users of a mobile terminal 10 on which a chatting application for displaying chatting in a cartoon story form is installed and a mobile terminal 30 on which the chatting application is not installed. As shown in FIG. 1, the mobile chatting system includes a first mobile terminal 10, a second mobile terminal 30, a chatting server 101 and a chatting web server 330.

The mobile terminals 10 and 30 may employ general smart phones (for example, iPhone 4S [produced by Apple Inc.], Galaxy S2 and Galaxy Note [produced by Samsung Electronics] or the like), tablet PC (for example, iPad2 [produced by Apple Inc.], Galaxy Tab [produced by Samsung Electronics] or the like), which may be easily carried, allow data communication by means of 3G, Wi-Fi or 4G communication methods, and operate various application programs.

However, the present invention is not limited to the above communication methods or products, and any mobile terminal capable of allowing data communication and also allowing installation and operation of various applications in addition to the above communication methods and the above products may be employed as the mobile terminals 10 and 30.

The first mobile terminal 10 has a chatting application installed thereto to display chatting between chatting users in a cartoon story form. Therefore, if a chatting message of a chatting user is transmitted or received, the first mobile terminal 10 displays a cartoon character as the chatting user, displays the chatting message in a speech balloon form beside the cartoon character, and displays chatting between the chatting users in a cartoon story form.

Here, the application represents a free or payable application program installed at the mobile terminals 10 and 30 to perform various functions. Such an application program may be obtained freely or with a payment from App Store (managed by Apple Inc.) in the case of iPhone of Apple, from Android Market if a mobile operation system is based on the Android (Google) platform, or from other various sources, and may be installed at the mobile terminals 10 and 30. In addition, these applications are not limited to iOS of Apple Inc. or the Android platform of Google, but any application program operable in various platforms which will be developed can also be used.

The first mobile terminal 10 includes a mobile chatting application installed thereto as described above, and receives member subscription from the first mobile terminal user along with member information of the user.

Here, the user is a person who would like to chat through the mobile terminals 10 and 30.

The user exchanges a chatting message with a partner mobile terminal with which the user would like to chat through the first mobile terminal 10—namely, a user of the second mobile terminal 30. In this case, the user is displayed as a cartoon character on the screen of the first mobile terminal 10, and a chatting message input by the user through the mobile terminal 10 or a chatting message received from the second mobile terminal 30 is displayed in a speech balloon form expressed beside the cartoon character of the user.

The second mobile terminal 30 is a mobile terminal at which a chatting application for displaying chatting between chatting users in a cartoon story form is not installed.

If receiving a chatting message from the first mobile terminal 10, the second mobile terminal 30 displays a cartoon character as the chatting user on a chatting web page, displays the chatting message of the chatting user in a speech balloon form beside the cartoon character, and displays chatting between chatting users in a cartoon story form on the screen of the second mobile terminal 30.

In other words, the first mobile terminal 10 displays chatting in a cartoon story form by means of the mobile chatting application, and the second mobile terminal 30 displays chatting in a cartoon story form through the chatting web page.

The chatting server 101 transmits/receives messages to/from the mobile terminals 10 and 30 to relay the mobile terminals 10 and 30 which are to chat with each other. The chatting server 101 exchanges a message with the first mobile terminal 10 by means of wireless data communication, which includes all data-communication methods existing at the present like 3G, Wi-Fi and 4G and those to be developed in the future.

The chatting web server 330 performs data communication with the chatting server and is accessed by the second mobile terminal 30. The chatting web server 330 receives a chatting message and a cartoon character from the first mobile terminal 10 through the chatting server 101. The chatting web server 330 displays the chatting message and the cartoon character received from the first mobile terminal 10 on the chatting web page accessed by the second mobile terminal 30, and if the chatting message input by the user of the second mobile terminal 30 is received from the second mobile terminal 30, the chatting web server 330 displays the chatting message input by the second mobile terminal 30 and the cartoon character of the user of the second mobile terminal 30 on the chatting web page and transmits them to the first mobile terminal 10 through the chatting server.

As shown in FIG. 4, the first mobile terminal 10 searches for the name of the partner from an address book of a mobile chatting application synchronized with the address book stored in the first mobile terminal 10. Here, the application is programmed so that, if the name of the partner is touched, an access-request signal is sent to the partner, as shown in FIG. 5.

The access-request signal contains an address of a web page having information about a chatting user ID of the first mobile terminal 10. As shown in FIG. 6, if the access-request signal received by second mobile terminal 30 is touched, a web browser of the second mobile terminal 30 is automatically executed, and the access-request signal—namely, the web page is displayed on the screen of the second mobile terminal 30. The second mobile terminal 30 finally allows chatting with the first mobile terminal 10 through the web page, and the web page is provided by the chatting web server 330.

As shown in FIG. 1, the chatting web server 330 makes data communications with the chatting server 101, and the first mobile terminal 10 conducts chatting in a cartoon story form with the second mobile terminal 30 through the mobile chatting application. As shown in FIG. 7, the second mobile terminal 30 conducts chatting in a cartoon story form with the first mobile terminal 10 through the web page.

On the web page according to the present invention, the mobile chatting system supporting a cartoon story-type conversation may further include a manager server 102.

The manager server 102 receives a member subscription request of a user from the first mobile terminal 10 and also receives information about the user of the first mobile terminal 10.

The manager server 102 receives a chatting message transmitted or received by the first mobile terminal 10 through the chatting server 101, calculates the data transmission traffic of the chatting message transmitted or received by the first mobile terminal 10, and endows a predetermined point to a user ID of the first mobile terminal 10 in proportion to the data transmission traffic.

Endowing a predetermined point means leveling up the user ID of the first mobile terminal 10, giving an experiment point to the user ID, giving game money to the user ID, or giving an item to the user ID.

Here, the game money is, for example, electronic cash endowed to the user ID, and the user may purchase various items according to his/her level by using the game money.

In the mobile chatting system supporting a cartoon story-type conversation on a web page according to the present invention, the game money includes gold or cash. Gold is a reward paid by the manager server 102 according to the increase of experience point or level, and cash may be used by the user of the first mobile terminal 10 to purchase an item from the manager server 102. In other words, in the mobile chatting system supporting a cartoon story-type conversation on a web page according to the present invention, a game item may be purchased using the game money, and the cash may be purchased through the manager server 102. Therefore, the mobile chatting system supporting a cartoon story-type conversation on a web page according to the present invention may be used as a payable service.

Here, the level means a grade of a user ID, and if experience points of the user ID are accumulated over a certain level, the level is adjusted upward. In addition, the experience point is meant to digitally express how much the user ID uses the mobile chatting system of the present invention in terms of time or data quantity. If the user ID uses the mobile chatting system of the present invention more in terms of time and data quantity, the experiment value numerically increases. The number of levels and the criterion of experience points for raising a level may be suitably adjusted and applied to a user ID according to a person who would like to implement the present invention.

If the experience point or level of the user ID is further increased, the mobile chatting system of the present invention endows more benefit to the user ID. For example, a user ID of a higher level may be endowed with benefits such as various character expressions, character clothes, character accessories, magical ability of the character, strength of the character, the increase of stature of the character or the like. In this case, a user of the mobile terminal 10 using the mobile chatting system according to the present invention will be encouraged to use the chatting system more actively in order to raise the level of his/her user ID.

In the mobile chatting system supporting a cartoon story-type conversation on a web page according to the present invention, as shown in FIG. 2, the first mobile terminal 10 may include a first message-writing unit 13, a first message-transmitting/receiving unit 12, a first image-forming unit 15 and a first image-storing unit 14.

The first message-writing unit 13 receives a chatting message from the chatting user of the first mobile terminal 10. The mobile terminal 10 may receive a message from a user by various means such as a QWERTY keyboard, a Heaven-Earth-Human keyboard or the like, and various keyboard-input methods such as touch screen, text conversion by voice recognition, pressure-sensitive keyboard or the like. The present invention is not limited by the message input method.

The first message-transmitting/receiving unit 12 has a function of receiving a message from the first message-writing unit 13 and transmitting the message to the chatting server 101. On the contrary, the first message-transmitting/receiving unit 12 may also receive a message, sent from the second mobile terminal 30, from the chatting server 101.

Messages may be transmitted or received using the data communication methods described above.

If receiving a message from the first message-writing unit 13, the first image-forming unit 15 displays a character of the user of the first mobile terminal 10 and displays the received message in a speech balloon form beside the character. On the contrary, a message received from the second mobile terminal 30—namely, a partner mobile terminal, via the chatting server 101 is displayed in a speech balloon beside the partner character. In this way, chatting between the users of the mobile terminals 10 and 30 is displayed in a cartoon story form on the first mobile terminal 10.

The first image-storing unit 14 stores cartoon-type conversation between the users of the mobile terminals 10 and 30 as a cartoon image. At this time, the user of the first mobile terminal 10 may selectively store only a desired frame as a cartoon image.

Here, the first image-forming unit 15 may recognize a text input to the first message-writing unit 13 or a text received from the second mobile terminal 30 and automatically change a character expression of the user of the first mobile terminal 10 according to the nature of the text. In other words, if the user inputs various emoticons (for example, ^^, --, or ☻) or imitative words (for example, rofl, lol, or haha), the first image-forming unit 15 recognizes the same and changes the image of the character to make an expression or behavior suitably set for the same. In addition, it may be preset to make a specific expression or behavior when a specific word or emoticon is input by the user.

In the mobile chatting system supporting a cartoon story-type conversation on a web page according to the present invention, the chatting web server 330 may include a second message-writing unit, a second message-transmitting/receiving unit, a second image-forming unit and a second image-storing unit.

The second message-writing unit, the second message-transmitting/receiving unit, the second image-forming unit and the second image-storing unit have substantially the same functions as the first message-writing unit 13, the first message-transmitting/receiving unit 12, the first image-forming unit 15 and the first image-storing unit 14 of the first mobile terminal depicted in FIG. 2, and a diagram thereof is substantially identical to FIG. 2 and thus not depicted separately.

The second message-writing unit receives a chatting message from the chatting user of the second mobile terminal 30.

The second message-transmitting/receiving unit receives a chatting message from the second message-writing unit, transmits the chatting message to the chatting server 101, and receives a chatting message, transmitted by the first mobile terminal 10, from the chatting server 101.

The second image-forming unit receives a chatting message, input by the user of the second mobile terminal 30, from the second message-writing unit, displays the chatting message in a speech balloon form beside a cartoon character of the chatting user on a web page, and displays the chatting message, transmitted by the first mobile terminal 10 from the second message-transmitting/receiving unit, in a speech balloon form beside the cartoon character of the user of the first mobile terminal 10, so that chatting between the chatting users is displayed in a cartoon story form on the web page of the second mobile terminal 30.

The second image-storing unit stores chatting in a cartoon story form between the chatting users as a cartoon image.

Here, the second image-forming unit may recognize a text input by the users of the first mobile terminal 10 and the second mobile terminal 30, and automatically change an expression of the cartoon character of the users of the first mobile terminal 10 and the second mobile terminal 30 according to the nature of the text. In other words, if the user inputs various emoticons (for example, ^^, --, or ☻) or imitative words (for example, rofl, lol, or haha), the second image-forming unit recognizes the same and changes the image of the character to make an expression or behavior suitably set for the same. In addition, it may be preset to make a specific expression or behavior when a specific word or emoticon is input by the user.

In the mobile chatting system supporting a cartoon story-type conversation on a web page according to the present invention, as shown in FIG. 3, the first mobile terminal 10 may further include a first voice-recognizing unit 17, a first voice-analyzing unit 18, a first voice-data-converting unit 19, a first tone-converting unit 20 and a first voice-output unit 21.

The first voice-recognizing unit 17 is a component for recognizing a voice of the chatting user of the first mobile terminal 10. The voice of the user may be recognized using a microphone of the first mobile terminal 10, and the chatting user may also separately allow his/her voice to be recognized through the voice-recognizing unit 17 of the first mobile terminal 10 in advance.

The first voice-analyzing unit 18 analyzes the tone of the voice of the chatting user of the first mobile terminal 10, recognized by the first voice-recognizing unit 17.

The tone represents a quality of a sound which is felt by a human, and in particular, the tone is determined as various patterns according to frequency bands of the sound, amounts of high and low frequencies distributed in the sound, and variation of the volume of sound.

The first voice-analyzing unit 18 recognizes a main frequency band of the recognized voice (a range from a lowest frequency band to a highest frequency band) and determines the main frequency band as the tone of the recognized voice of the user of the first mobile terminal 10.

The first voice-data-converting unit 19 converts a chatting message, input to the first mobile terminal 10, into voice information. A message input with a text may be converted into voice information in various ways. For example, if the first mobile terminal chatting user inputs the text "Hi!" to the first mobile terminal 10, this text may be pronounced with a voice as it is and then converted into voice information.

The first tone-converting unit 20 receives the voice information from the first voice-data-converting unit 19 and converts the voice information into a frequency band (for example, 1000 Hz to 1500 Hz) of the tone of the chatting user of the first mobile terminal 10, analyzed by the first voice-analyzing unit 18. In addition, a band pass filter (BPF) is composed using the frequency band of the user tone to filter off other frequency bands.

The first voice-output unit 21 outputs the voice information of the chatting message, converted into the user tone of the first mobile terminal 10 by the first tone-converting unit 20, to a speaker of the first mobile terminal 10. In addition, the first voice-output unit 21 transmits the voice information of the chatting message, converted into the chatting user tone of the first mobile terminal 10, to the second mobile terminal through the chatting server 101, so that the second mobile terminal 30 may also output the chatting message input to the first mobile terminal 10 with the voice information of the chatting message, converted into the chatting user tone of the first mobile terminal 10.

In the mobile chatting system supporting a cartoon story-type conversation on a web page according to the present invention, the chatting web server 330 may further include a second voice-recognizing unit, a second voice-analyzing unit, a second voice-data-converting unit, a second tone-converting unit and a second voice-output unit. The second voice-recognizing unit, the second voice-analyzing unit, the second voice-data-converting unit, the second tone-converting unit and the second voice-output unit have substantially the same functions as the first voice-recognizing unit 17, the first voice-analyzing unit 18, the first voice-data-converting unit 19, the first tone-converting unit 20 and the first voice-output unit 21, and thus a block diagram thereof is not depicted.

The second voice-recognizing unit recognizes a voice of the chatting user of the second mobile terminal 30.

The second voice-analyzing unit analyzes the tone of the voice recognized by the second voice-recognizing unit. The tone represents a quality of a sound which is felt by a human, and in particular, the tone is determined as various patterns according to frequency bands of the sound, amounts of high and low frequencies distributed in the sound, and variation of the volume of sound.

The second voice-analyzing unit recognizes a main frequency band of the recognized voice (a range from a lowest frequency band to a highest frequency band) and determines the main frequency band as a tone of the recognized voice of the user of the second mobile terminal.

The second voice-data-converting unit converts a chatting message, input to the second mobile terminal 30, into voice information. A message input with a text may be converted into voice information in various ways. For example, if the second mobile terminal chatting user inputs the text "Hi!" to the second mobile terminal 30, this text may be pronounced with a voice as it is and then converted into voice information.

The second tone-converting unit receives the voice information from the second voice-data-converting unit and converts the voice information into a frequency band (for example, 1000 Hz to 1500 Hz) of the tone of the chatting user of the second mobile terminal 30, analyzed by the second voice-analyzing unit. In addition, a band pass filter (BPF) is composed using the frequency band of the user tone to filter off other frequency bands.

The second voice-output unit outputs the voice information of the chatting message, converted into the user tone of the second mobile terminal by the second tone-converting unit, to a speaker of the second mobile terminal 30. In addition, the second voice-output unit transmits the voice information of the chatting message, converted into the chatting user tone of the second mobile terminal, to the first mobile terminal 10 through the chatting server, so that the first mobile terminal 10 may also output the chatting message input to the second mobile terminal 30 with the voice information of the chatting message, converted into the chatting user tone of the second mobile terminal 30.

The mobile chatting system supporting a cartoon story-type conversation on a web page according to the present invention may be changed and modified in various ways, and specific embodiments are depicted in the drawings and explained in the detailed description. However, these embodiments are not intended to limit the present invention, and the present invention should be understood as including all modifications, equivalents and replacements which fall within its scope.

The scope of the present invention is defined by the appended claims, and parentheses used in the claims are not intended to limit the invention but to clearly express relevant elements. The limitations within the parentheses should also be interpreted as essential elements.

REFERENCE SYMBOLS

10: first mobile terminal
11: CPU
12: first message-transmitting/receiving unit
13: first message-writing unit
14: first image-storing unit
15: first image-forming unit
16: push informing unit
17: first voice-recognizing unit
18: first voice-analyzing unit
19: first voice-data-converting unit
20: first tone-converting unit
21: first voice-output unit
30: second mobile terminal
100: integrated system
101: chatting server
102: manager server
103: database
104: manager terminal
105: IPNS
200: push-service server
310: SNS server
320: other web servers
330: chatting web server

The invention claimed is:

1. A mobile chatting system for allowing cartoon story-type chatting between chatting users of a mobile terminal on which a chatting application for displaying chatting in a cartoon story form is installed and a mobile terminal on which the chatting application is not installed, the mobile chatting system comprising:

a first mobile terminal on which the chatting application is installed, wherein when transmitting or receiving a first chatting message of a first chatting user, the first mobile terminal displays a first cartoon character as the first chatting user, displays the first chatting message in a speech balloon form beside the first cartoon character, and displays chatting between the chatting users in a cartoon story form;

a second mobile terminal configured to, when receiving the first chatting message from the first mobile terminal, display the first cartoon character as the first chatting user on a chatting web page, display the first chatting message of the first chatting user in a speech balloon form beside the first cartoon character, and display chatting between the chatting users in a cartoon story form;

a chatting server configured to relay chatting between mobile terminals by transmitting or receiving the first chatting message and the first cartoon character of the first chatting user between the first mobile terminal and the second mobile terminal;

a chatting web server configured to display the first chatting message and the first cartoon character received from the first mobile terminal through the chatting server on the chatting web page accessed by the second mobile terminal, when a second chatting message is input from the second mobile terminal, to display the second chatting message input by the second mobile terminal and a second cartoon character of the second mobile terminal user on the chatting web page, and to transmit the second chatting message input by the second mobile terminal and the second cartoon character of the second mobile terminal user to the first mobile terminal through the chatting server; and a manager server configured to receive one or more chatting messages transmitted or received by the first mobile terminal through the chatting server, to calculate a data transmission traffic of the one or more chatting messages transmitted or received by the first mobile terminal, and to endow a predetermined point to a user ID of the first mobile terminal based on each of the data transmission traffic and a time for which the user ID has used the chatting application;

wherein, the predetermined point: (a) endows the user ID of the first mobile terminal with a benefit, the benefit including an increase in a character height; and (b) is usable by the chatting user of the first mobile terminal to purchase a game item, and wherein the first mobile terminal is configured to recognize a tone of the first chatting user based on a main frequency band of a recognized voice of the first chatting user and the second mobile terminal is configured to convert a textual message into an audible message with voice information having the tone of the first chatting user.

2. The mobile chatting system according to claim 1, wherein the first mobile terminal includes:

a first message-writing unit configured to receive a chatting message from a chatting user of the first mobile terminal;

a first message-transmitting/receiving unit configured to receive the chatting message from the first message-writing unit, to transmit the chatting message to the chatting server, and to receive a chatting message transmitted by the second mobile terminal from the chatting server;

a first image-forming unit configured to receive a chatting message input by the first mobile terminal user from the first message-writing unit, to display the chatting message in a speech balloon form beside a cartoon character of the chatting user, and to display a chatting message transmitted by the second mobile terminal from the first message-transmitting/receiving unit beside a user cartoon character of the second mobile terminal in a speech balloon form, thereby displaying chatting between the chatting users at the first mobile terminal in a cartoon story form; and a first image-storing unit for storing chatting between the chatting users in the cartoon story form as a cartoon image.

3. The mobile chatting system according to claim 2, wherein the first image-forming unit recognizes a text included in a chatting message input by users of the first mobile terminal and the second mobile terminal and automatically changes an expression of user cartoon characters of the first mobile terminal and the second mobile terminal according to the nature of the text.

4. The mobile chatting system according to claim 1, wherein the chatting web server includes:

a second message-writing unit configured to receive a chatting message from a chatting user of the second mobile terminal;

a second message-transmitting/receiving unit configured to receive the chatting message from the second message-writing unit, to transmit the chatting message to the chatting server, and to receive a chatting message transmitted by the first mobile terminal from the chatting server;

a second image-forming unit configured to receive a chatting message input by the second mobile terminal user from the second message-writing unit, to display the chatting message in a speech balloon form beside a cartoon character of the chatting user on the web page, and to display a chatting message transmitted by the first mobile terminal from the second message-transmitting/receiving unit in a speech balloon form beside a user cartoon character of the first mobile terminal, thereby displaying chatting between the chatting users in a cartoon story form on the web page of the second mobile terminal; and a second image-storing unit configured to store chatting between the chatting users in the cartoon story form as a cartoon image.

5. The mobile chatting system according to claim 4, wherein the second image-forming unit recognizes a text included in a chatting message input by users of the first mobile terminal and the second mobile terminal and automatically changes an expression of user cartoon characters of the first mobile terminal and the second mobile terminal according to the nature of the text.

6. The mobile chatting system according to claim 1, wherein a second chatting user of the second mobile terminal accesses the chatting web page by interacting with an access request sent to the second mobile terminal by a first chatting user of the first mobile terminal.

7. The mobile chatting system according to claim 6, wherein the chatting web page is automatically executed on the second mobile terminal in response to the interaction with the access request.

8. The mobile chatting system according to claim 7, wherein the access request includes a web address of the chatting web page.

9. The mobile chatting system according to claim 7, wherein the access request is generated in response to the first chatting user touching on the first mobile terminal an entry in an address book that corresponds to the second chatting user.

* * * * *